UNITED STATES PATENT OFFICE.

HENRY DREYFUS, OF BASEL, SWITZERLAND.

PROCESS OF TRANSFORMING CELLULOSE ACETATES.

1,286,172. Specification of Letters Patent. Patented Nov. 26, 1918.

No Drawing. Original application filed October 2, 1911, Serial No. 652,442. Divided and this application filed January 21, 1916. Serial No. 73,496.

*To all whom it may concern:*

Be it known that I, HENRY DREYFUS, a citizen of the Republic of Switzerland, residing at Basel, Switzerland, have invented certain new and useful Improvements in Processes of Transforming Cellulose Acetates, of which the following is a specification.

The present invention relates to the transformation of the solubilities of certain varieties of cellulose acetate, by treating said acetate, in a precipitated form, with a dilute acid.

My researches have shown that certain cellulose acetates, namely those which are soluble in a mixture of chloroform and alcohol and which are also soluble in a mixture of tetrachlorethane and alcohol and which are soluble in more or less diluted acetone, (that is to say, some of these acetates are soluble in concentrated acetone directly while others are soluble only upon the addition of five, or ten, or up to thirty per cent. of water), and which cellulose acetates are substantially insoluble in chloroform and in concentrated or diluted alcohol, and in alcohol-benzene (mixture of equal volumes), upon being treated in a precipitated form with dilute acids, are converted into products having other solubilities, which solubilities progressively change, and it is accordingly desirable to stop the reaction, at a point where certain desired solubilities exist. It will be noted that there is a difference between stopping the reaction at a point where certain solubilities exist, and stopping the reaction after a certain stated length of time.

As a specific example of my invention, to which the claims of the present application are not limited, the following example is given:

100 parts of cellulose acetate, for example the cellulose acetate produced in accordance with the first paragraph of Example 1 of my British Patent 20977 of 1911, are introduced into about 500 parts of diluted nitric acid, containing about 12% of actual $HNO_3$, and are treated therein, at ordinary temperature, until the desired solubility has been reached, which action is controlled by withdrawing and testing the solubility of test portions from time to time. Some time after the commencement of the treatment, besides the existing solubility in acetone there is developed a solubility in alcohol-benzene (say a mixture of equal volumes) and about this time a solubility in diluted alcohol (75% alcohol to 25% water) is also developed. In prolonging the treatment, the solubility in alcohol-benzene decreases and finally disappears, while at the same time the solubilities in alcohol-chloroform and in alcohol tetrachlorethane and in dilute alcohol still continue, which latter solubility afterward begins to decrease and finally disappears completely. After this, the solubility in pure acetone also decreases more and more, and the products become soluble in more and more highly diluted acetone, and finally products soluble in hot water or in aqueous solutions remain.

As soon as the desired solubility has been developed, the reaction is stopped, the products separated in an appropriate manner, and are washed and dried.

The nitric acid can be replaced by other organic or inorganic acids or by acid salts, or by mixtures of these materials, which substances taken collectively are hereinafter referred to as "an acid substance".

The length of time necessary to produce the desired solubility depends upon a number of factors, particularly upon the temperature, the concentration and strength of the acid employed, higher temperatures and higher concentrations and strengths of acid, tending to accelerate the reaction.

In addition to this, the strength and concentration of the acid produce other differences in the results, thus with weaker acids the stopping of the reaction at particular points is facilitated, and it is possible to select the time of stopping the reaction so as to allow (or not to allow, as desired) very slight changes in the properties. In using the more concentrated acids, however, certain of the desired solubilities may never appear, or may exist only for such a short time that it is not possible to stop the reaction at the time when such a solubility exists. This is particularly the case with the solubility in chloroform which disappears after persisting only for an extremely short time, and is also true of the solubility in alcohol-benzene. In case the acid employed is not stronger than about 12% $HNO_3$, the products will become soluble in chloroform as an intermediate stage, during the stage of being soluble in alcohol-benzene. If however a materially stronger acid is employed, this chloroform-soluble stage does not develop, although the solubilities in the other solvents will be produced as described.

During the stage in which the products are soluble in hot diluted alcohol, for example alcohol of about 75%, they may become very soluble therein, so that by spreading out the heated solution of the new product in dilute alcohol, upon a suitable glass surface, they become almost immediately congealed, and after appropriate drying, one obtains films of a most excellent quality, which are very pliable and which may be folded at the same points many times without breaking. During a part of the time in which the products are soluble in hot dilute alcohol, they are also soluble in hot alcohol-benzene, being very soluble therein and capable of producing highly viscous solutions, which solutions upon cooling congeal and produce films which are coherent and transparent.

This application is a division of my copending application, Serial No. 652,442, filed October 2, 1911, now Patent No. 1,181,857, issued May 2, 1916, and is also a division of my copending application 782,530, filed Aug. 1, 1913.

What I claim is:—

1. The process of treating cellulose acetates not soluble to any material extent in alcohol-benzene or in chloroform but soluble in acetone of a high concentration and soluble in alcohol-chloroform, which comprises treating the same with dilute nitric acid, until the cellulose acetates become soluble in alcohol-benzene, as determined by tests at successive stages of the process.

2. A process of treating cellulose acetates, insoluble in chloroform and in diluted alcohol but soluble in diluted acetone and in alcohol-chloroform, which comprises subjecting the same to the action of dilute nitric acid, until cellulose acetates soluble in diluted alcohol are produced.

3. A process of converting a cellulose acetate insoluble in chloroform, but readily soluble in alcohol-chloroform and in alcohol-tetrachlorethane, into products having other solubilities, which comprises treating the said acetate, in a precipitated form, with a solution containing an acid substance, until the solubilities have materially changed, and then interrupting the reaction before the disappearance of the desired newly acquired properties as to solubility in particular agents.

4. A process of converting a cellulose acetate substantially insoluble in alcohol-benzene and in chloroform, but readily soluble in alcohol-chloroform, and in alcohol-tetrachlorethane, into products having other solubilities, which comprises treating the said acetate, in a precipitated form, with a solution containing an acid substance, until a product readily soluble in alcohol-benzene is produced, and then stopping the reaction.

5. The process of treating cellulose acetate not soluble in chloroform, but soluble in a somewhat diluted acetone which comprises treating the same with dilute nitric acid until the cellulose acetate becomes soluble in chloroform as determined by tests at successive stages of the process.

6. The process of treating cellulose acetate not soluble in chloroform but soluble in a somewhat diluted acetone, which comprises treating the same with dilute nitric acid until the cellulose acetates become simultaneously soluble in chloroform, and in alcohol-benzene as determined by tests at the successive stages of the process.

7. The process of treating cellulose acetates not soluble in chloroform but soluble in a somewhat diluted acetone, which comprises treating the same with dilute nitric acid until the cellulose acetates first become soluble in chloroform and then continuing the specified treatment with acid until they again become insoluble in chloroform, whereby the solubilities in some other solvents are altered.

In testimony whereof, I have hereunto subscribed my name.

HENRY DREYFUS.

Witnesses:
ARNOLD ZUBER,
EMILE DREYFUS.